Oct. 14, 1969  A. K. VYAZNIKOV ET AL  3,472,299
CANE STEM CHOPPER

Filed March 1, 1967

3,472,299
CANE STEM CHOPPER
Alexandr Konstantinovich Vyaznikov, Ul. Kirova 39, kv. 43; Alexei Ivanovich Davydov, Oktyabrsky prospekt 91/97, kv. 23; Vasily Pavlovich Egorov, pos. Kalinina 94, kv. 6; Nikolai Nikitovich Melnikov, Krasnogorskaya ul. 22, korp. 6, kv. 10; Boris Andreevich Popov, Oktyabrsky prospekt 143, kv. 3; and Evgeny Ilich Khokhlov, 1 Zavodskoi dvor. 11, kv. 32, all of Ljubertsy Moskovskoi oblasti, U.S.S.R.; and Nikolai Frolovich Charykov, Mosfilmovskaya ul. 25, kv. 3, Moscow, U.S.S.R.
Filed Mar. 1, 1967, Ser. No. 619,656
Int. Cl. A01d 45/10
U.S. Cl. 146—98                                  5 Claims

ABSTRACT OF THE DISCLOSURE

A cane harvester having a leaf removing means, including rods rotating with a cutter shaft, with the leaf removing means extending across the path of feed of cane by slow moving pocketed discs that hold the cane for cutting by knives on the cutter shaft. The harvester is provided with a first blower to separate most of the leaves from the chopped stems, and a second blower operating as the chopped stems fall from one conveyor to another to remove all remaining leaves.

---

Figure 1:
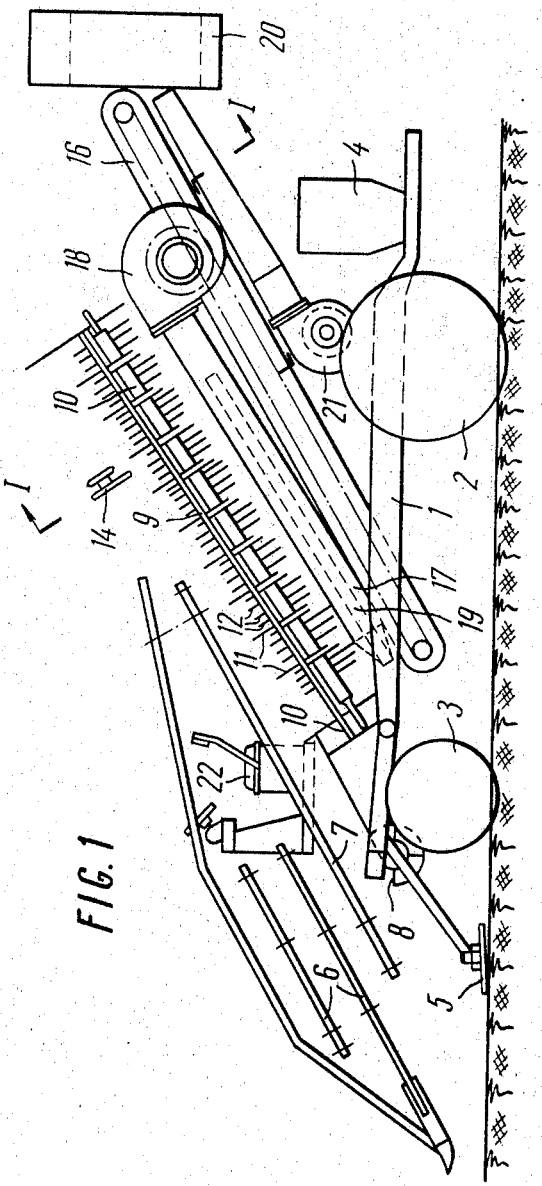

The present invention relates to cane stem choppers such as used in cane harvesting.

The known cane stem choppers are fashioned as two parallel shafts provided with at least one pair of knife disks.

Disadvantages of the known cane stem choppers involve complexity of design, difficult maintenance and bulky size, as well as the need for special members to convey stems from one working element to another.

The object of the present invention is to eliminate the above disadvantages by providing a cane stem chopper simple in design and easy in operation.

According to the invention, this is achieved by providing in the cane stems chopper a special attachment mounted on at lease one of the shafts designed to remove the leaves from the cane stems.

The leaf remover can be defined by flexible or hinged pins or as blades secured to the shaft. The pins can be set on the shaft so as to extend beyond the knife disks which are secured on the same shaft.

Figure 2:
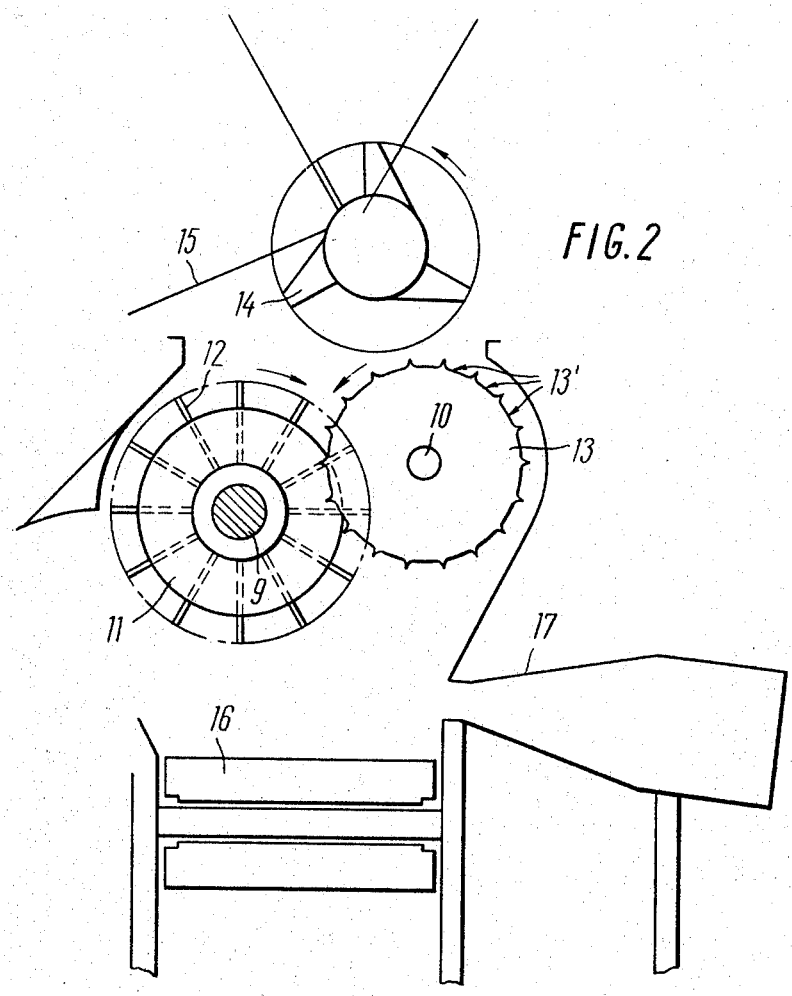

An embodiment of the invention to be described by way of example is shown in the drawing, wherein:

FIGURE 1 is a diagrammatic view in side elevation of the cane harvester provided with a chopper (side view), and FIGURE 2 is a view taken along line I—I of FIGURE 1, the view looking in the direction of the arrows.

The cane harvester is a self-propelled unit comprising a main frame 1 (FIGURE 1) provided with driving wheels 2, steering wheels 3, an engine 4 and all the necessary working elements.

Arranged in front of the cane harvester is a cutterbar 5. Passing above and ahead of the cutterbar 5 are two pairs of endless chains 6 provided with pins and designed to pick up and bring the stems toward the cutterbar. Behind and somewhat over the latter a main conveyor 7 is arranged. A clod separator 8 for cleaning the lower portion of the stems is provided as shown. An under the main conveyor is a leaf remover inclined lengthwise of the cane harvester and designed to remove leaves from the stems and to chop the stems into pieces. The leaf remover comprises two parallel shafts 9 and 10 (FIGURE 2) rotating in opposite directions. Knife disks 11 (FIGURE 1) are secured at certain distances along the shaft 9, and flexible pins 12 are set between the knife disks.

The pins can be either flexible rods, shaft-secured hinged pins, or blades. Parallel to the shaft 9, the shaft 10 which carries shear pocket disks 13 (FIGURE 2) is mounted. The pocket disks are opposite to the knife disks 11 and serve to feed the stems to the flexible pins 12 rotating with the shaft 9 and knife disks 11. The pins 12 remove leaves from the stems, while the knife disks 11 cut the stems into pieces. The pocket disks 13 hold the stems during the cleaning operation and serve as shear elements for cutting the stems into pieces.

To ensure the cleaning of the stems when they are held by the pocket disks and during the process of cutting, the speed of rotation of pockets $13^1$ of the pocket disk, which contacts the stems, is far slower than that of the ends of the flexible pins 12 acting on the stems and leaves during cleaning.

A topping knife 14 which serves to cut the stem tops is provided above the chopper and behind the main conveyor. The cut off tops are moved away from the cane cutter by a slide blade 15.

A gathering conveyor 16 (FIGURES 1 and 2) is arranged under the chopper. On the left side of the machine (at the right in FIGURE 2) and above the conveyor is provided nozzle 17 of an air blower 18. In front of the nozzle and on the same side of the gathering conveyor 16 is an elongated opening 19 to allow the air flow over conveyor 16 to carry blown leaves and waste through and out of the cane harvester. Behind the gathering conveyor 16 and extending across the cane harvester is a discharge conveyor 20. A blower 21 is provided under the gathering conveyor 16 to separate the remaining leaves from the cane stems as they fall from the gathering conveyor 16 onto the discharge conveyor 20.

Control of the cane harvester is effected from a control stand 22.

With the cane harvester in operation the cane stems are collected by the chains 6 and fed by the main conveyor 7. While being moved on the main conveyor 7, the lower portions of the stems are cleaned by the clod separator 8 and the tops of the stems are simultaneously bent back in the direction of the movement of the harvester. When leaving the main conveyor 7 the stem tops contact the knife 14 which cuts off the tops. With the aid of the slide blade 15 the cut-off tops are pushed aside anywhere on the field. The commercial portions of the stems fall into the chopper to lie parallel to shafts 9 and 10 so as to be picked up by the pocket disks 13 of the chopper. As the rotation speed of the pockets of the pocket disks is several times less than that of the ends of the flexible pins 12, the pocket disks move the stems slowly toward the flexible pins 12 rotating with the shaft 9 and the knife disks 11. The trajectory of the movement of the flexible pins 12 and knife disks 11 overlaps the trajectory of the movement of the pocket disks 13.

Removal of the leaves and subsequent cutting of stems takes place owing to the difference of speeds and the overlapping of the trajectories.

When falling onto the gathering conveyor 16 the chopped mass has air blown therethrough by the nozzle 17 directing the air flow from the blower 18. Carried by this air flow, the leaves and waste are ejected from the cane harvester through the opening 19. The cleaned pieces of the stems then drop onto the discharge conveyor 16 and thence to conveyor 20. While said pieces are falling onto the conveyor 20, they are additionally cleaned by the air flow from the blower 21. The discharge conveyor 20 feeds the cleaned stems to a hauling means which may be a truck moving parallel to the harvester.

Although the present invention has been described with reference to the preferred embodiment thereof, various modifications and alterations can be made without departing from the idea and scope of the invention which those skilled in the art will easily understand.

Those modifications and alterations are considered as not departing from the idea and scope of the invention and the attached claims.

We claim:

1. A cane stem chopper particularly for use with cane harvesters and adapted to remove leaves from the cane stems, comprising a frame, two parallel shafts mounted in the frame for rotation in opposite directions, disc knives arranged on one of said shafts in axially spaced relationship, leaf remover means on said one shaft located between the disc knives, said leaf remover means being of such length as to extend beyond the periphery of said disc knives, and shear discs on the other shaft opposite the disc knives for feeding the stems to the leaf remover means whereby the leaf remover means remove the leaves from the stems and the disc knives cut the stems into pieces with the shear discs holding the stems during and serving as shear elements for cutting the stems into pieces.

2. The cane stem chopper as claimed in claim 1 in which said leaf remover means is defined by flexible pins.

3. The cane stem chopper as claimed in claim 1 in which said leaf remover means is defined by pins hingedly secured to said one shaft.

4. The cane stem chopper as claimed in claim 1 in which said leaf remover means is defined by blades.

5. The cane stem chopper as claimed in claim 2 in which the trajectory of movement of the flexible pins and the disc knives overlaps the trajectory of the shear discs.

References Cited

UNITED STATES PATENTS

| 1,722,780 | 7/1929 | Wilkes et al. | 56—61 |
| 3,090,188 | 5/1963 | Gorham | 146—107 X |

W. GRAYDON ABERCROMBIE, Primary Examiner

U.S. Cl. X.R.

56—17, 62; 130—31